United States Patent [19]

Löhr et al.

[11] 4,395,500

[45] Jul. 26, 1983

[54] PROTECTIVE COLLOID-FREE PLASTICS DISPERSION HAVING A BIMODAL PARTICLE SIZE DISTRIBUTION

[75] Inventors: Gernot Löhr, Mainz; Rolf Reinecke, Wiesbaden, both of Fed. Rep. of Germany

[73] Assignee: Hoechst Aktiengesellschaft, Frankfurt am Main, Fed. Rep. of Germany

[21] Appl. No.: 306,875

[22] Filed: Sep. 29, 1981

[30] Foreign Application Priority Data

Oct. 1, 1980 [DE] Fed. Rep. of Germany ....... 3036969

[51] Int. Cl.³ .............................................. C08L 25/14
[52] U.S. Cl. .................................... 523/221; 524/523; 525/221; 525/223; 525/228
[58] Field of Search ............... 525/221, 228, 223, 241; 524/523; 523/221

[56] References Cited

U.S. PATENT DOCUMENTS

| | | | |
|---|---|---|---|
| 3,728,418 | 4/1973 | Hinsdale | 525/221 |
| 3,784,501 | 1/1974 | Pettit | 525/221 |
| 3,935,151 | 1/1976 | Nickerson et al. | 525/221 |
| 3,947,528 | 3/1976 | Wingler et al. | 525/221 |
| 3,992,486 | 11/1976 | Lang | 525/228 |
| 4,009,226 | 2/1977 | Ott et al. | 525/71 |
| 4,247,438 | 1/1981 | Eck et al. | 260/29.6 T |
| 4,284,433 | 8/1981 | Aignesberger et al. | 525/227 |

*Primary Examiner*—Carman J. Seccuro
*Attorney, Agent, or Firm*—Curtis, Morris & Safford

[57] ABSTRACT

A protective colloid-free plastics dispersion yielding after drying a polymer film which under the influence of moisture has no or little tendency to whitening contains polymer particles having a bimodal size distribution, that is, on the one hand relatively coarse particles and on the other hand relatively fine particles. The polymer component consists of at least 10 weight % of particles having an average diameter of less than 0.2 μm and of 90 weight % at most of particles having an average diameter of more than 0.25 μm, and the ratio of average grain size of coarse to fine polymer is at least 2:1. The plastics dispersion is suitable especially as binder dispersion in plasters and gloss paints.

3 Claims, 1 Drawing Figure

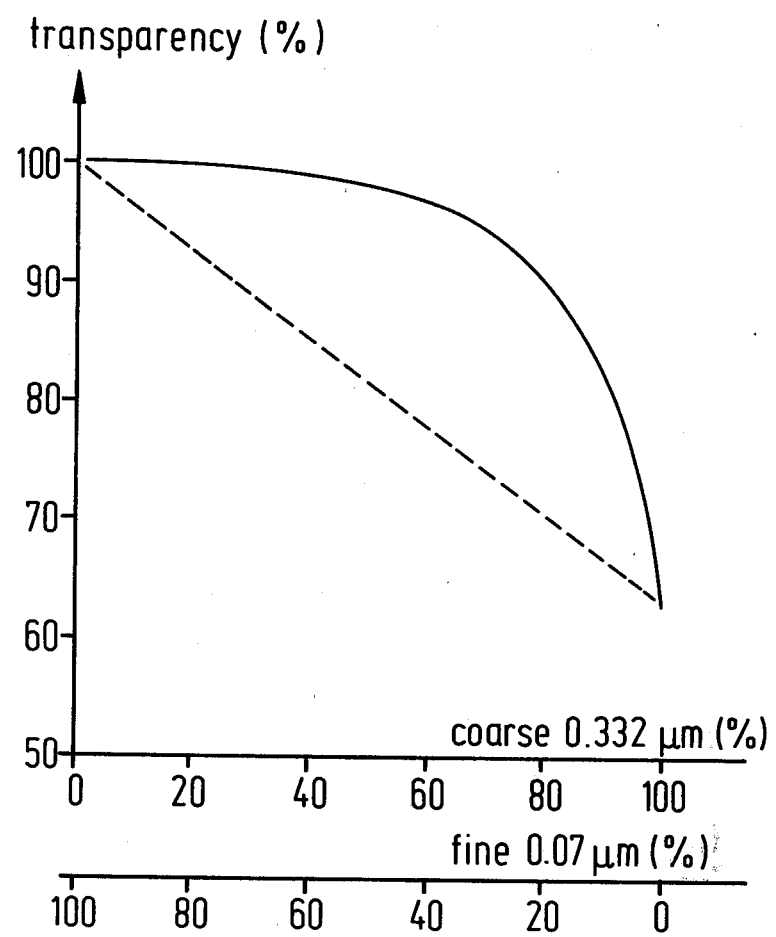

PROTECTIVE COLLOID-FREE PLASTICS DISPERSION HAVING A BIMODAL PARTICLE SIZE DISTRIBUTION

The invention relates to a protective colloid-free plastics dispersion having a bimodal particle size distribution, which after drying yields a polymer film which under the influence of dampness and moisture shows no or little tendency to whitening.

Films of plastics dispersions having an average particle size of more than 0.2 μm become milky or opaque under the influence of dampness and moisture. This whitening manifest itself as disturbing in the case where such plastics dispersions are used as binder in plasters containing coarse extenders, especially colored coarse extenders, or when they are employed for low pigmented or unpigmented coatings.

Plastics dispersions having an average particle size of less than 0.2 μm, especially less than 0.15 μm, do not show this whitening although having an identical composition. However, due to their low shear stability they are unfit for being used in the manufacture of plaster containing coarse extenders. Moreover, very fine-grain dispersions containing the amounts of solids as desired for processing purposes have a too high viscosity.

The present invention provides a protective colloid-free plastics dispersion having a bimodal particle size distribution, wherein the plastics portion consists of at least 10 weight % of a fine-grain polymer having an average particle size of below 0.2 μm and 90 weight % at most of a coarse-grain polymer having an average particle size of more than 0.25 μm, and the average particle size ratio of coarse to fine polymer is at least 2:1.

The invention provides especially a plastics dispersion of the above kind the plastics portion of which consists of from 60 to 80 weight % of a polymer having an average particle size of more than 0.25 μm, and of from 40 to 20 weight % of a polymer having an average particle size of below 0.2 μm.

The plastics dispersion of the invention gives films having an increased transparency. This effect is the more pronounced the smaller the average particle size of the fine-grain plastics portion and the greater the ratio of the average sizes is.

The easiest way of preparing the dispersion of the invention is by mixing a coarse-grain and a fine-grain dispersion. On the other hand, it is possible to obtain the dispersion by polymerizing a polymerization batch first to a conversion rate of 80% only, and starting the reaction again by fresh addition of initiator.

When the coarse-grain and the fine-grain dispersion are prepared separately, the average particle size is controlled in known manner via the emulsifier concentration; higher emulsifier concentration resulting in finer particles.

The disperse phase of the dispersion according to the invention consists of copolymers formed of styrene and/or esters of acrylic acid or esters of methacrylic acid; the monomers being chosen in such a manner that copolymers having a sufficiently low film-forming temperature are the result. Unsaturated acids or their amides, such as acrylic acid or methacrylic acid, acrylamide or methacrylamide, can be used additionally in amounts of below 10 weight % (relative to the total of monomers). The copolymer may contain furthermore up to 5 weight % (relative to the total of monomers) of monomers capable of being cross-linked, for example diallyl compounds or diacryl compounds, halogen compounds such as vinyl chloroacetate, epoxy compounds such as glycidyl acrylate or -methacrylate, or hydroxy compounds such as 2-hydroxyethylacrylate or -methacrylate.

The bimodal dispersion of the invention is prepared in known manner by polymerizing the monomers in aqueous emulsion, in the absence of protective colloids, and in the presence of a water-soluble initiator system and ionic and nonionic emulsifiers; the average particle size being adjusted by the emulsifier concentration in the starting phase. Suitable for use are the known emulsifiers on the basis of sulfated, neutralized alkanols or phenols, optionally also etherified with ethylene oxide, or sulfated or neutralized polyethylene oxide or polypropylene oxide, furthermore neutralized aromatic or aliphatic sulfonic acids or carboxylic acids. The amount of these emulsifiers is from 0.5 to 10, preferably 1 to 5, weight % (relative to the total of monomers).

In addition, nonionic emulsifiers on the basis of ethoxylated aliphatic or aromatic alcohols and phenols or polyethylene oxide or polypropylene oxide, likewise optionally ethoxylated, may also be used. When employing them, their amount should be from 0.5 to 5 weight % (relative to the total of monomers).

As initiator system, water-soluble per-compounds are preferably used, which depending on the polymerization temperature can be combined with a reducing compound; in these latter cases a water-insoluble per-compound may be used alternatively. The per-compounds are used in amounts of from 0.01 to 2, preferably 0.05 to 1, weight % (relative to the total of monomers).

The polymerization temperature is from 0° to 100° C., preferably 30° to 80° C. The solids content of the dispersions is from 30 to 70, preferably 45 to 60, weight %.

The plastics dispersion of the invention having a bimodal particle size distribution is distinguished by an improved whitening behavior as compared to coarse-grain dispersions alone, that is, higher transparency values are obtained on storage in water. It is especially suitable as binder in plasters and paints.

The following examples illustrate the invention.

PREPARATION OF COARSE-GRAIN AND FINE-GRAIN DISPERSIONS (Percentages are by weight)

1. Coarse-grain dispersions

First, a pre-emulsion is prepared from 250 g of water, 28 g of a 50% aqueous solution of the sodium salt of an oxethylated and sulfated tri-t-butylphenol (7–8 mols of ethylene oxide per mol), 350 g of styrene, 350 g of butylacrylate, 7 g of acrylic acid and 14 g of methacrylic acid.

100 g of water are introduced into a 2-liter-three-necked flask provided with agitator, reflux condenser, thermometer and feeder devices for the initiator solution and the pre-emulsion. An amount of pre-emulsion is added which ensures that the emulsifier concentrations indicated in Table 1 are attained. After heating to 80° C., 0.8 g of ammonium persulfate in 20 g of water is added, and after 20 minutes the dosed addition of the pre-emulsion is started, and this addition is continued in such a manner that the dosage is complete after 4 hours. Simultaneously and parallelly, 1.2 g of ammonium sulfate in 90 g of water are added. The dosage of the monomer emulsion being complete, 1 g of ammonium persulfate in 10 g of water is added, the polymerization is continued for a further 2 hours, and the batch is then cooled. The dispersion is adjusted to pH 8 by means of 10% aqueous sodium hydroxide solution.

TABLE 1

Coarse-grain dispersion, solids content 60%

| Dispersion | Emulsifier concentration in starting batch (g/l) | Average particle size of the copolymer (μm) |
|---|---|---|
| A | 0.2 | 0.418 |
| B | 0.5 | 0.332 |
| C | 0.65 | 0.287 |
| D* | 0.15 | 0.375 |

*In dispersion D, styrene is replaced by methylmethacrylate.

2. Fine-grain dispersion

Operations are as described sub (1) with, however, the following changes: In the case of dispersions E through G and I, the starting batch consists of 250 g of water, 0.5 g of emulsifier and such an amount of pre-emulsion that the emulsifier concentrations indicated in Table 2 are obtained. The pre-emulsion is started from 340 g of water instead of from 250 g. In dispersion I, styrene is replaced by methylmethacrylate.

In the case of dispersion H, the starting batch consists of 150 g of water, 0.5 g of emulsifier and such an amount of pre-emulsion that the emulsifier concentration in the starting batch is 20 g/l. The pre-emulsion is prepared with 1,400 g of water.

TABLE 2

| Dispersion | Emulsifier concentration in starting batch (g/l) | Average particle size of the copolymer (μm) |
|---|---|---|
| E | 1.4 | 0.152 |
| F | 1.2 | 0.175 |
| G | 0.8 | 0.12 |
| H | 30 | 0.07 |
| I | 20 | 0.083 |

Mixtures according to the invention

All dispersions are adjusted to 50% of solids content, and subsequently mixed as indicated in Table 3. A film having a thickness of 300 μm is applied to glass plates by means of a doctor knife, and dried for 2 hours at 40° C. The transparency of the film is determined after a 30 minutes' storage in water (measuring apparatus: Dr. Lange photometer, universal measuring unit UME 3, probe LMG 035, filter BG 12, Servocor 201).

The accompanying drawing is a diagrammatic view demonstrating the influence of increasing content of fine-grain dispersion in mixtures of the dispersions B and H on the transparency of the films obtained from these mixtures. The broken line shows the values expected, the continuous line represents the values found.

This diagram demonstrates that a weight percentage of 10% already of fine-grain dispersion an unexpected synergistic effect is the result.

Examples 1 through 10 of Table 3 are plastics dispersions of the invention, prepared by mixing fine-grain and coarse-grain dispersions. The results of the transparency tests of the starting dispersions and the mixtures of the invention are likewise listed in Table 3. Increase of transparency simultaneously means reduced whitening.

TABLE 3

| Example | Dispersion | Ratio of particle size coarse/fine | Transparency (%) |
|---|---|---|---|
|  | E | — | 98.6 |
|  | F | — | 96.8 |
|  | G | — | 99.5 |
|  | H | — | 99.8 |
|  | I | — | 99.9 |
|  | A | — | 45 |
| 1 | A + 20% E | 2.7:1 | 68.2 |
| 2 | A + 20% F | 2.4:1 | 64.1 |
| 3 | A + 20% G | 3.5:1 | 73.7 |
| 4 | A + 20% H | 6:1 | 80.3 |
|  | B | — | 62.9 |
| 5 | B + 20% E | 2.1:1 | 74.9 |
| 6 | B + 20% G | 2.8:1 | 84.3 |
| 7 | B + 20% H | 4.7:1 | 90.5 |
|  | C | — | 79.9 |
| 8 | C + 20% G | 2.4:1 | 88.5 |
| 9 | C + 20% H | 4.1:1 | 91.7 |
|  | D | — | 71.2 |
| 10 | D + 17.0% I | 2.7:1 | 68.2 |

What is claimed is:

1. A protective colloid free plastics aqueous dispersion having a bimodal particle size distribution, wherein the plastics portion consists of from 60 to 80 weight % of a coarse-grain polymer having an average particle size of more than 0.25 μm and from 40 to 20 weight % of a fine-grain polymer having an average particle size of below 0.2 μm, the average particle size ratio of said coarse-grain polymer to said fine-grain polymer being at least 2:1, and wherein the coarse-grain polymer and the fine-grain polymer are copolymers consisting essentially of styrene and/or esters of acrylic acid or esters of methacrylic acid and, optionally, unsaturated acids or amides of unsaturated acids in an amount of below 10 weight percent (relative to the total monomers) and, optionally, monomers capable of being cross-linked in an amount of up to 5 weight percent (relative to the total of monomers).

2. Plastics bound plaster or gloss paint containing as binder the plastics dispersion of claim 1.

3. Unpigmented coating containing the plastics dispersion of claim 1.

* * * * *